United States Patent [19]

Constantinescu

[11] 4,377,286
[45] Mar. 22, 1983

[54] MULTICOLORED GLOBE ADAPTED TO MAKE COMBINATIONS BETWEEN COLORS ON MULTITUDINOUS DIRECTIONS

[76] Inventor: Spiridon Constantinescu, 2085 Islington Ave., Apt. 1408, Weston, Ontario, Canada, M9P 3R1

[21] Appl. No.: 315,344

[22] Filed: Oct. 26, 1981

Related U.S. Application Data

[63] Continuation-in-part of Ser. No. 302,212, Sep. 14, 1981, abandoned.

[51] Int. Cl.³ .................. A63F 9/08; G09B 1/14
[52] U.S. Cl. .................. 273/153 S; 434/131; 434/402
[58] Field of Search .......... 273/153 S, 156, 157 R; 434/131, 213, 402, 403

[56] References Cited

U.S. PATENT DOCUMENTS 3,081,089  3/1963  Gustafson .................. 273/156

FOREIGN PATENT DOCUMENTS

WO81/01638  6/1981  PCT Int'l Appl. .

Primary Examiner—William H. Grieb

[57] ABSTRACT

This invention relates to a globe divided by a plurality of symmetrical meridional lines and by an equatorial line and/or by tropical lines in a plurality of spherical triangles and spherical quadrilaterals which are grouped on different colors or which are covered with colored drawings representing colored stories or the world map between two poles. Every couple of symmetrical meridans divides the globe in two hemispheres which can be turned so that one hemisphere changes the poles. The equator divides the globe in other two hemispheres which can rotate independently and the tropical lines divide the globe in zones which also can rotate independently. Combining this plurality of spatial rotations disposed on different angles and on different planes between them, becomes possible to make arrangements of spherical triangles and quadrilaterals to get different symmetrical colored designs or correct drawings according to everyone's ability.

9 Claims, 24 Drawing Figures

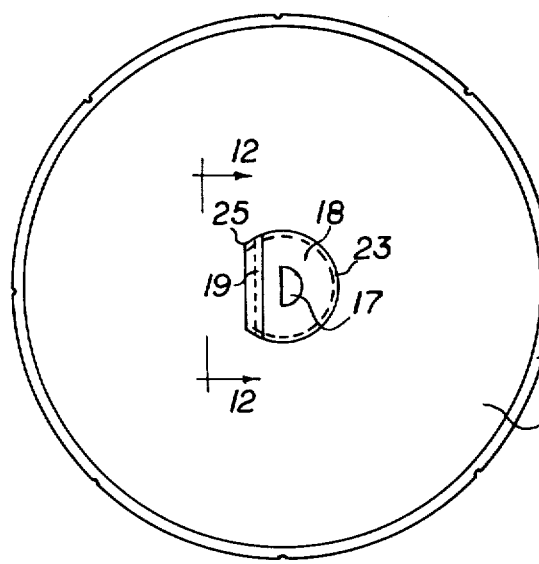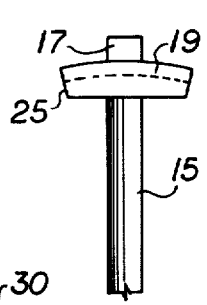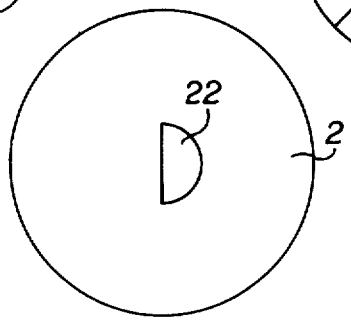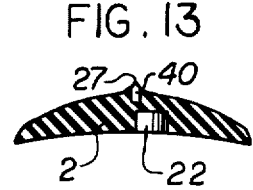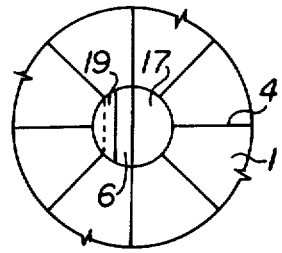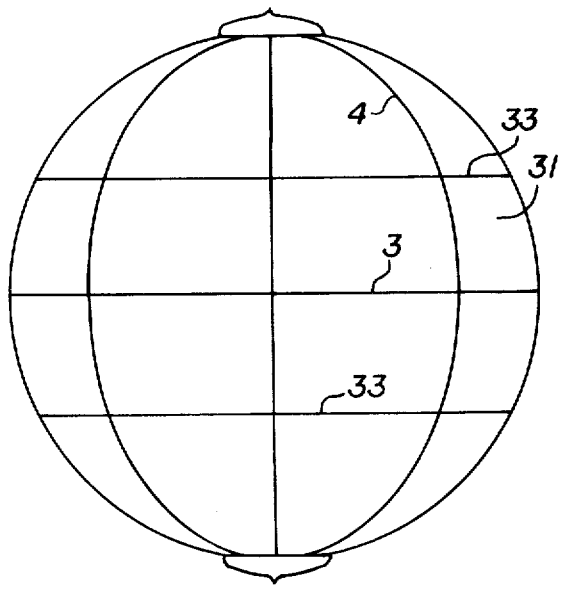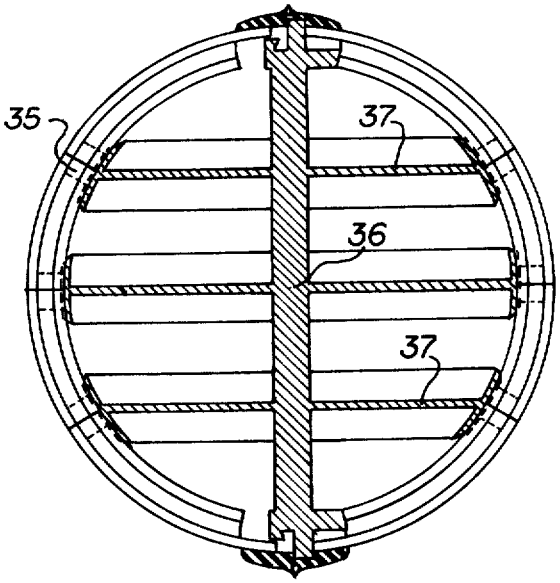

1

MULTICOLORED GLOBE ADAPTED TO MAKE COMBINATIONS BETWEEN COLORS ON MULTITUDINOUS DIRECTIONS

This is a Continuation-In-Part of my application Ser. No. 302,212, filed on Sept. 14, 1981 now abandoned.

SUMMARY OF THE INVENTION

The present invention has been devised with the general object of providing apparatus by means of which colored spherical triangles and quadrilaterals shaping a globe can be arranged in definite orders turning on many angles and planes. The spherical triangles and quadrelaterals have a great mobility, but in the meantime they are partially interdependently moving always in groups. Making globes with different number of spherical triangles and quadrelaterals and varying the number of chosen colors, is possible to obtain various globes from the simplest to the most complex, and consequently the same will be the problems to be solved.

A main object of the present invention is to provide an apparatus, by which people can spend their leisure time agreeably and usefully solving the globe's problems, and furthermore improving the observation, memory, computation and ingenuity.

A further object of the present invention is to provide different globes concerning their complexity, suitable for children, youths or adults, and for any grade of discernment.

A further object of the present invention is to satisfy people by finding at their level the key of problems without great effort, and choosing gradually the next level of difficulty.

The invention is described in detail in the following, with reference to the accompanying drawings and schemes showing the embodiments of an apparatus and the way of solving certain of globe's problems.

BRIEF DESCRIPTION OF THE DRAWINGS AND SCHEMES

FIG. 11 is a top plan view of the internal framework.

FIG. 12 is a view along line 12—12 in FIG. 11.

FIG. 13 is an enlarged, cross-sectional view of a pole.

FIG. 14 is an enlarged, underneath view of a pole.

FIG. 15 is a partial enlarged top plan view of the globe without pole.

FIG. 16 is a side elevation of a globe having an equatorial and two tropical cuttings.

FIG. 17 is a sectional view of the globe of FIG. 16 along a meridional line.

DETAILED DESCRIPTION OF SOME EMBODIMENTS OF THE INVENTION AND EXAMPLES OF ITS UTILITY

Figure 1:
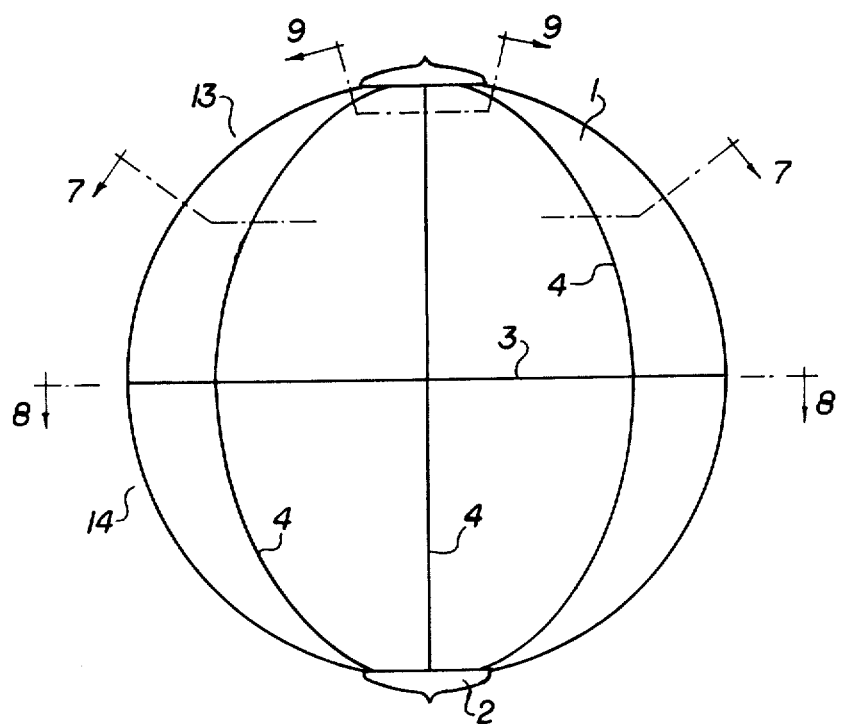
FIG. 1 is a side elevation of a globe according to the invention.
Figure 2:
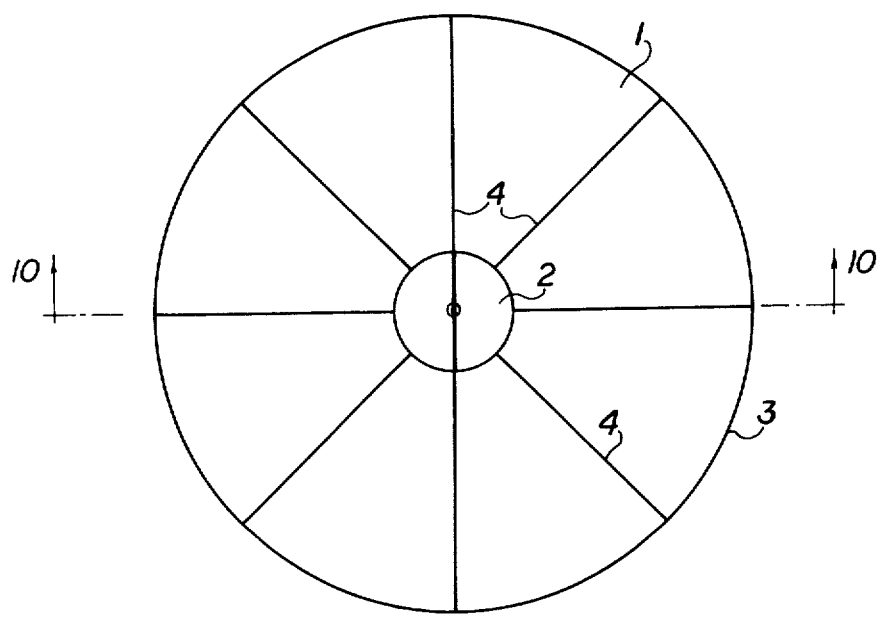
FIG. 2 is a top plan view of the globe of FIG. 1.
Figure 3:
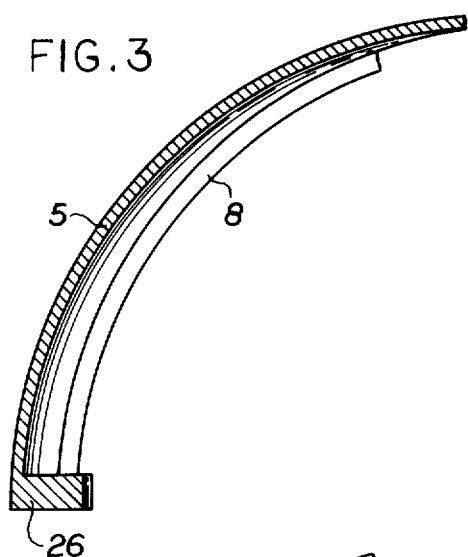
FIG. 3 is an enlarged meridional cross-sectional view of a spherical triangle.
Figure 4:
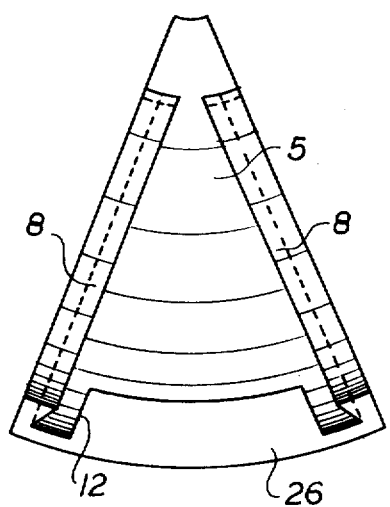
FIG. 4 is a front view of a spherical triangle.
Figure 5:
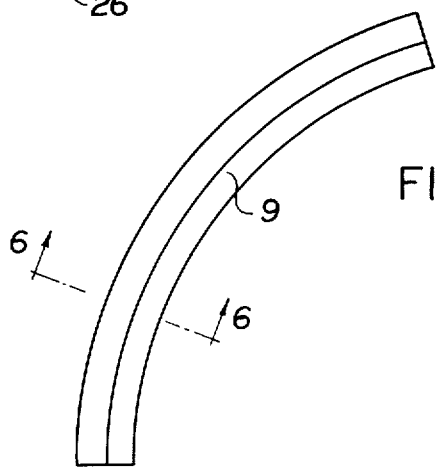
FIG. 5 is an enlarged lateral view of a cylindrical channel.
Figure 6:
FIG. 6 is a sectional view along line 6—6 in FIG. 5.
Figure 7:
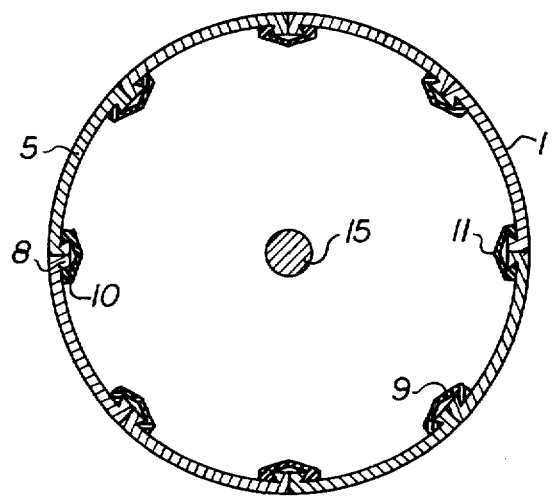
FIG. 7 is a sectional view along line 7—7 in FIG. 1.
Figure 8:
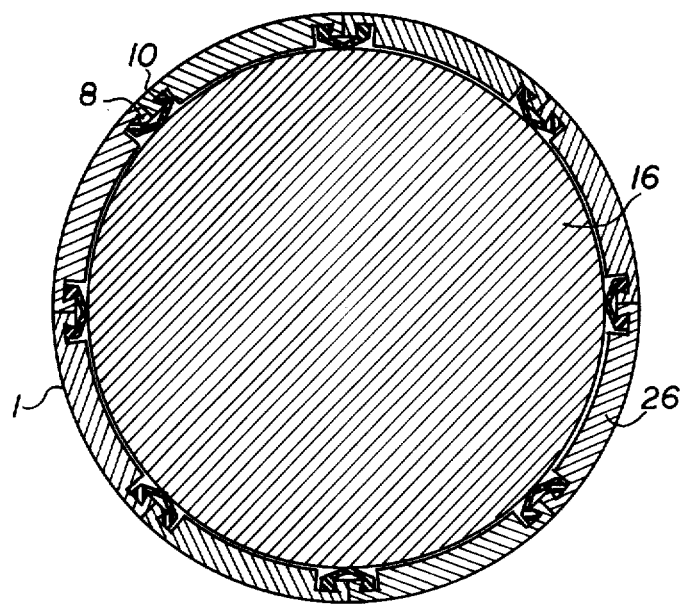
FIG. 8 is a sectional view along line 8—8 in FIG. 1.
Figure 9:
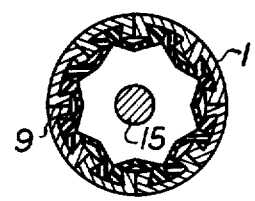
FIG. 9 is a sectional view along line 9—9 in FIG. 1.
Figure 10:
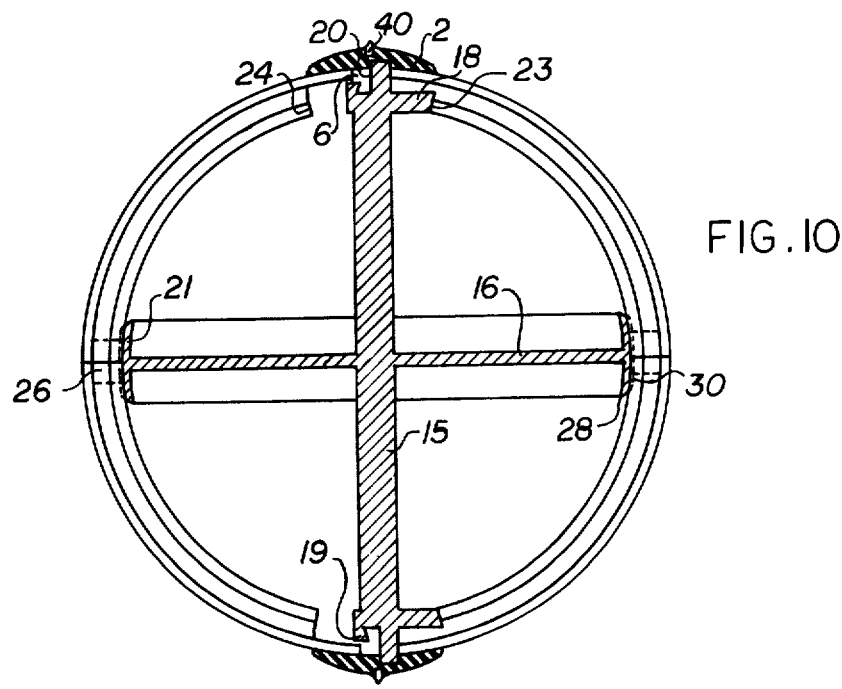
FIG. 10 is a sectional view along line 10—10 in FIG. 2.

The first apparatus illustrated is a globe FIG. 1 and FIG. 2 composed of 16 spherical triangles 1 joined together between two poles 2. Spherical triangles 1 have their sides marked by equatorial line 3 and by meridional lines 4. A spherical triangle 1 FIGS. 3 and 4 has a shell 5 bounded by gliding means 8 on meridional lines 4 and a thickened part 26 on equatorial line 3. Spherical triangles 1 are set together by cylindrical channels 9 FIGS. 5 and 6 which are disposed inside the globe and their flanges being gliding means 10 in slidable engagement with gliding means 8. Cylindrical channel 9 has a web 29 which is thin and angled shaping the edge 30, and as a result channel 9 is flexible yielding a small variation of the distance between gliding means 10. Both gliding means 8 and 10 are hook shaped for preventing the detachment of spherical triangles 1 but allowing a sliding movement between them and a small extension of the periphery of the globe. The edge 11 of cylindrical channel 9 shapes a circle with its center in the center of the globe. Gliding means 8 and channels 9 are long from equatorial line 3 to a circle placed toward the pole where cylindrical channels 9 join together side by side as in FIG. 9. Spherical triangles 1 are grouped by cylindrical channels 9 in two hemispheres, the top hemisphere 13 and the low hemisphere 14 FIG. 1. These two hemispheres are held together by internal framework 7 FIG. 10 which includes axle 15, equatorial disk 16 and partial disk 18. Each end of axle 15 is axially cut in half shaping spindle 17 for locking pole 2. The periphery of partial disk 18 is slightly sloped toward the center of the globe as shown in FIG. 10 shaping truncated partial cone 23. In FIGS. 9 and 10, gliding means 8 of spherical triangles 1 and cylindrical channels 9 are cut toward the pole shaping truncated cone 24 which has the same shape as truncated partial cone 23 of partial disk 18. Cylindrical channels 9 being flexible the hemispheres 13 and 14 clamp over partial disks 18 which lock these hemispheres between poles 2. Partial disks 18 have also gliding means 19. When hemisphere 13 rotates over hemisphere 14, the equatorial ends of cylindrical channels 9 of a hemisphere slide over thickened parts 26 of spherical triangles of the other hemisphere and the polar ends of cylindrical channels 9 of the hemisphere which has smaller frictions slide over adjacent truncated partial cone 23. The edges 12 of thickened parts 26, FIG. 4, are rounded close to equatorial line 3 for an easy engagement in rotation of cylindrical channels 9 over opposite thickened parts 26, and the edges 25 of partial disk 18 FIG. 11 is also rounded for an easy engagement of the same rotation. Partial disks 18 have gliding means 19 for establishing the continuity of gliding means 10 for gliding means 8 of spherical triangles 1 placed in the vicinity of partial disks 18 and freed for rotation about local meridian 20 FIG. 6. Partial disks 18 restrain from rotation half of spherical triangles 1 and half plus two of cylindrical channels 9 about the local meridian 20 FIG. 6 passing through the diameter of spindle 17 and parallel with gliding means 19. The ends of gliding means 8 are slightly rounded (not shown) for an easy engagement in rotation with gliding means 10 and 19. Equatorial disk 16 is surrounded by spherical section 21 which ensure a correct axial position for hemispheres 13 and 14. The edges 28 of spherical section 21 are rounded for an easy engagement of meridional rotations. The periphery of spherical section 21 has notchs 30 which are settled one for each meridian and engage edges 11 of cylindrical channels 9 so as to ensure a continuity between the meridians of hemispheres 13 and 14. Pole 2 includes semicircular dentation 22 matching with spindle 17, and rib 27 for handling from outside axle 15. Each pole 2 is fixed to axle 15 by clip means (not shown). Shells 5 of spherical triangles 1 are cut toward poles 2 shaping holes 6 for allowing the rotation of spindle 17. Each pole has one hole 40 for setting the globe into a known Earthglobe frame (not shown).

The globe as described is divided in two hemispheres 13 and 14 by the equatorial line 3 and in 8 hemispheres by the meridional lines 4. There are 5 planes of rotation, one equatorial and four meridional planes. Hemispheres 13 and 14 are free for independently rotation between them and each one has its spherical triangles 1 and cylindrical channels 9 joined together by gliding means 8 and 10. The other hemispheres divided by meridional lines 4 are grouped in couples by partial disks 18 which are solid connected with axle 15 and poles 2. Turning poles 2 with ribs 27 upon a meridional line 4, a plane of rotation will be established on that meridian and the opposite hemisphere will be independently rotatable. The hemisphere which rotates on a meridional line changes the cylindrical channels 9 at the plane of rotation because partial disks 18 restrain from rotation the opposite hemisphere including its adjacent cylindrical channels 9. In a second example, the globe FIGS. 16 and 17 is composed of 16 spherical triangles 1 and 16 spherical quadrelaterals 31. Spherical triangles have their sides marked by tropical lines 33 and by meridional lines 4. Spherical quadrelaterals 31 have their sides marked by equatorial line 3, tropical lines 33 and meridional lines 4. Basically the spherical triangle is the same except its extent which in this case is from pole 2 to tropical line 33. A spherical quadrelateral 31 has the same shell, gliding means and thickened part as the spherical triangle 1 and in addition it has toward tropical line 33 the thickened part 35. The cylindrical channels are the same except that they are cut on tropical lines 33, and for this reason on a meridian they are 8 cylindrical channels instead of four. The internal framework 36 basically is the same except that on axle 15 they are supplementary two tropical disks 37 which have their spherical sections shaped as the shape of the globe at tropics. This globe has supplementary two planes of rotation, one for each tropic.

Figure 18:
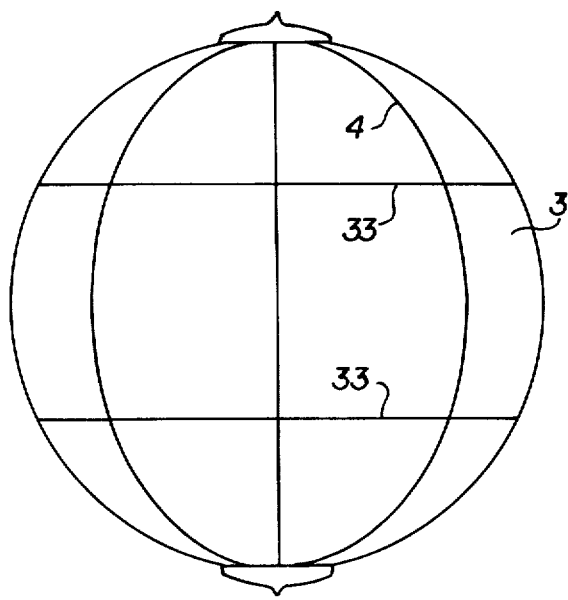
FIG. 18 is a side elevation of a globe having two tropical cuttings.
Figure 19:
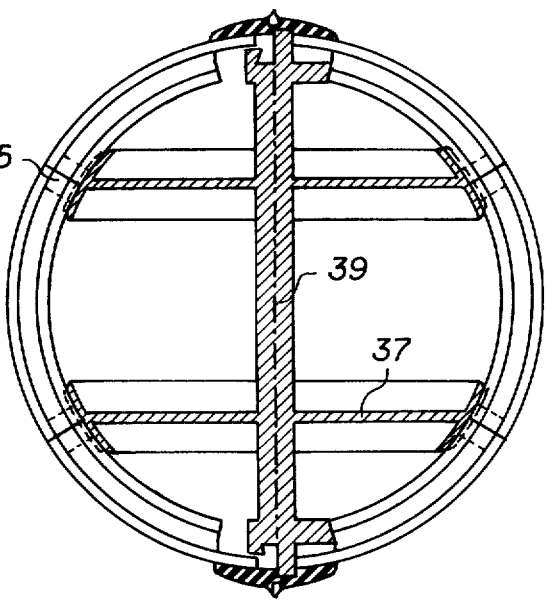
FIG. 19 is a sectional view of the globe of FIG. 18 along a meridional line.

In the third example, the globe FIGS. 18 and 19 is composed of 16 spherical triangles 1 and 8 spherical quadrilaterals 38. Basically this globe is the globe of second example without the cutting on equatorial line. Spherical triangles 1 are identical as in the second example, and spherical quadrelaterals 38 are big as two opposite spherical quadrelaterals 34 put together. The thickened part 26 is not necessary and each spherical quadrelateral 38 has two thickened parts 35. On a meridian they are 6 cylindrical channels and the internal framework 39 has only two tropical disks 37, the equatorial disk 16 being not necessary. This globe has one plane of rotation less than in the second example and this plane is on the equatorial line but the problems to be solved will be quite differently.

Having spherical triangles 1 and spherical quadrelaterals 31 or 38 grouped on different colors, and turning them spatially as shown, many combination between colors can be obtained so as will be described. Furthermore the globe can be covered with colored drawings representing the world map or a colored story which can be scrambled by shown rotations and afterward can be arranged in order for part of them or for the whole ensemble.

Figure 20:
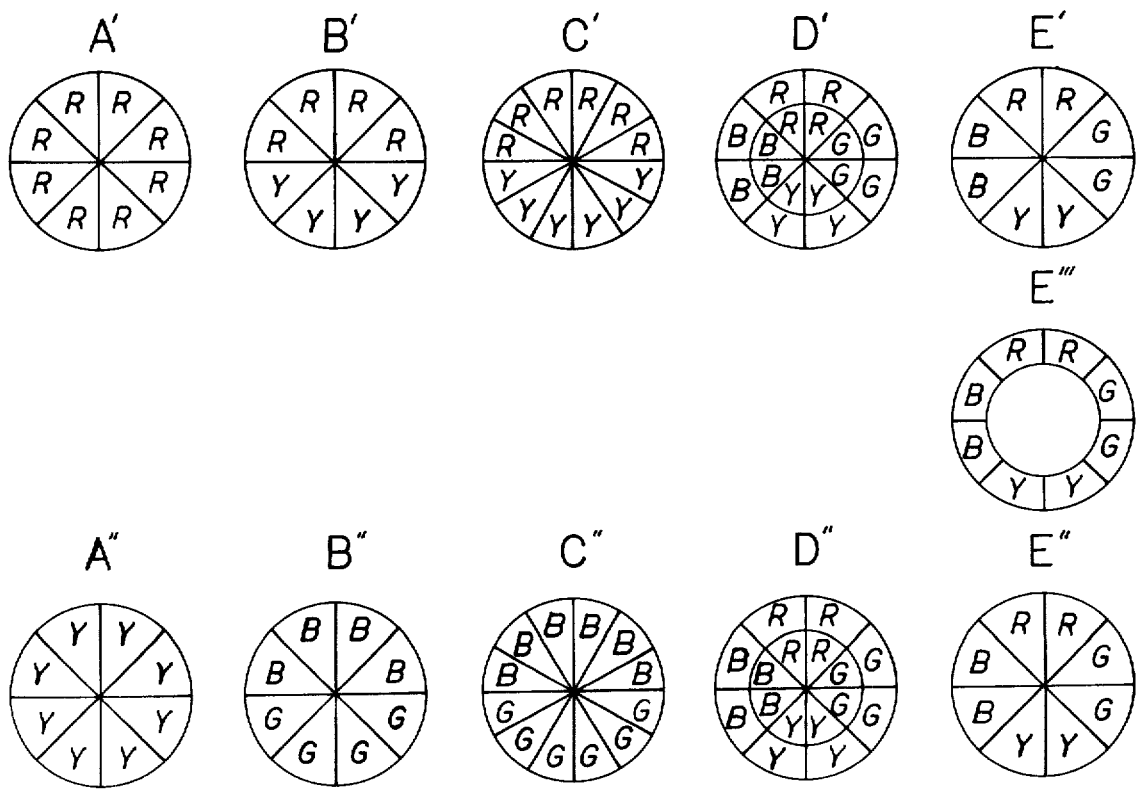
FIG. 20 shows schematically five globes with different colors on spherical triangles and quadrelaterals.

FIG. 20 shows schematically from A'-A" to E'--E"-E''' five different globes. The letters A',B',C',D',E' mark the top hemispheres, the letters A",B",C",D",E" mark the low hemispheres, and the letter E''' marks the torrid zone with their spherical triangles and quadrelaterals. The letters R,Y,B,G represent respectively the colors red, yellow, blue and green. Imagining the low hemispheres to be transparent, in these schemes the upper spherical triangles of top hemispheres correspond to the upper spherical triangles of low hemispheres. FIG. 20 A',A" shows a globe with 16 spherical triangles and two colors, red and yellow. FIG. 20 B',B" shows a globe with 16 spherical triangles and four colors, red, yellow, blue and green. FIG. 20 C',C" shows a globe with 24 spherical triangles and four colors, red, yellow, blue and green. FIG. 20 D',D" shows a globe with 16 spherical triangles and 16 spherical quadrelaterals and four colors, red, yellow, blue and green. FIG. 20 E',E", E''' shows a globe with 16 spherical triangles and 8 spherical quadrelaterals and four colors, red, yellow, blue and green. The meridional lines being always disposed symmetrically across poles 2, the spherical triangles on each hemisphere (13 and 14) are in pairs and as a result, spherical triangles 1 are always multiples of four. Such combinations are, of course, merely illustrative of the present invention and may be readily modified and equivalents in colors or number to be made by they skilled in this art.

Figure 21:
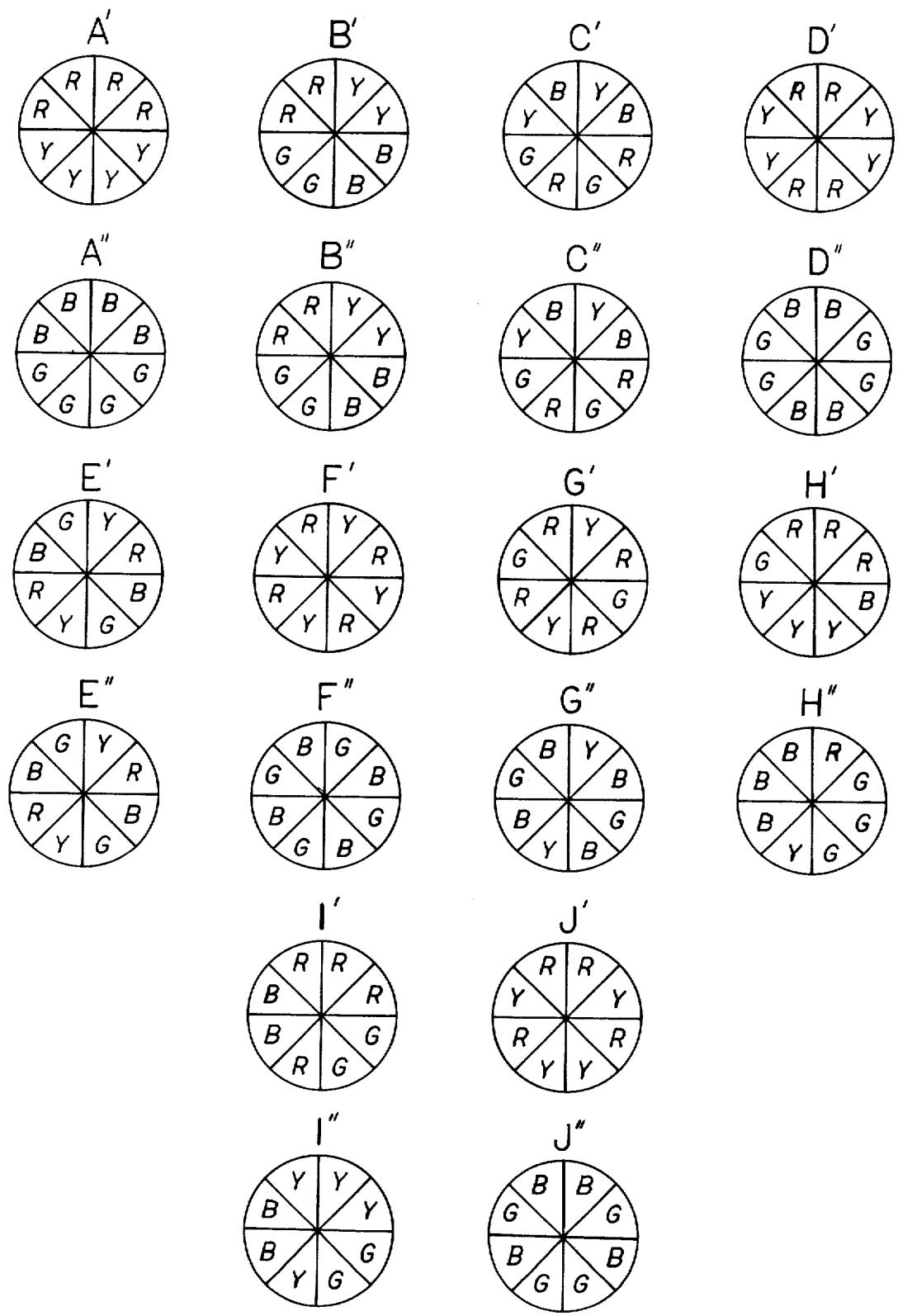
FIG. 21 shows schematically examples of symmetrical arrangements of a globe with 16 triangles and four colors.
Figure 22:
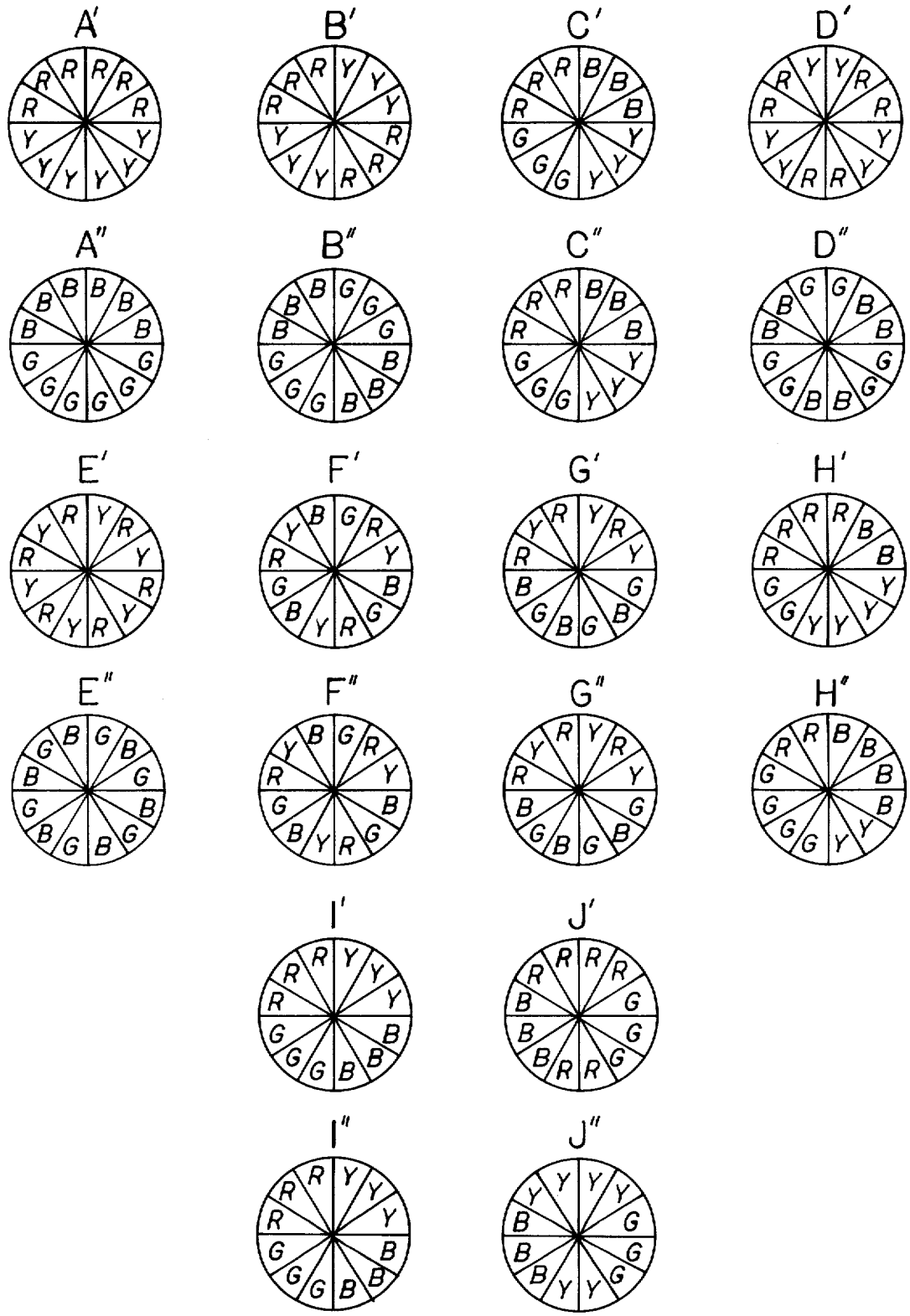
FIG. 22 shows schematically examples of symmetrical arrangements of a globe with 24 triangles and four colors.

FIG. 21 shows schematically from A'-A" to J'-J" examples of symmetrical arrangements of colors for the globe of FIG. 20 B'-B" and FIG. 22 shows the same thing for the globe of FIG. 20 C'-C".

For showing the exercises the following symbols have been used: a strong meridional line marks the plane of rotation for two adjacent hemispheres and an arrow beside a strong meridional line marks the hemisphere which rotates changing its poles, a strong circle marks that the equatorial plane is the plane of rotation and an arrow with a digit placed beside circle marks the hemisphere which rotates, the direction and the steps of rotation, one step being a spherical triangle. The rotations are numbered consecutively by FIGS. 1, 2, 3, etc. placed between the top hemispheres and the low hemispheres.

Figure 23:
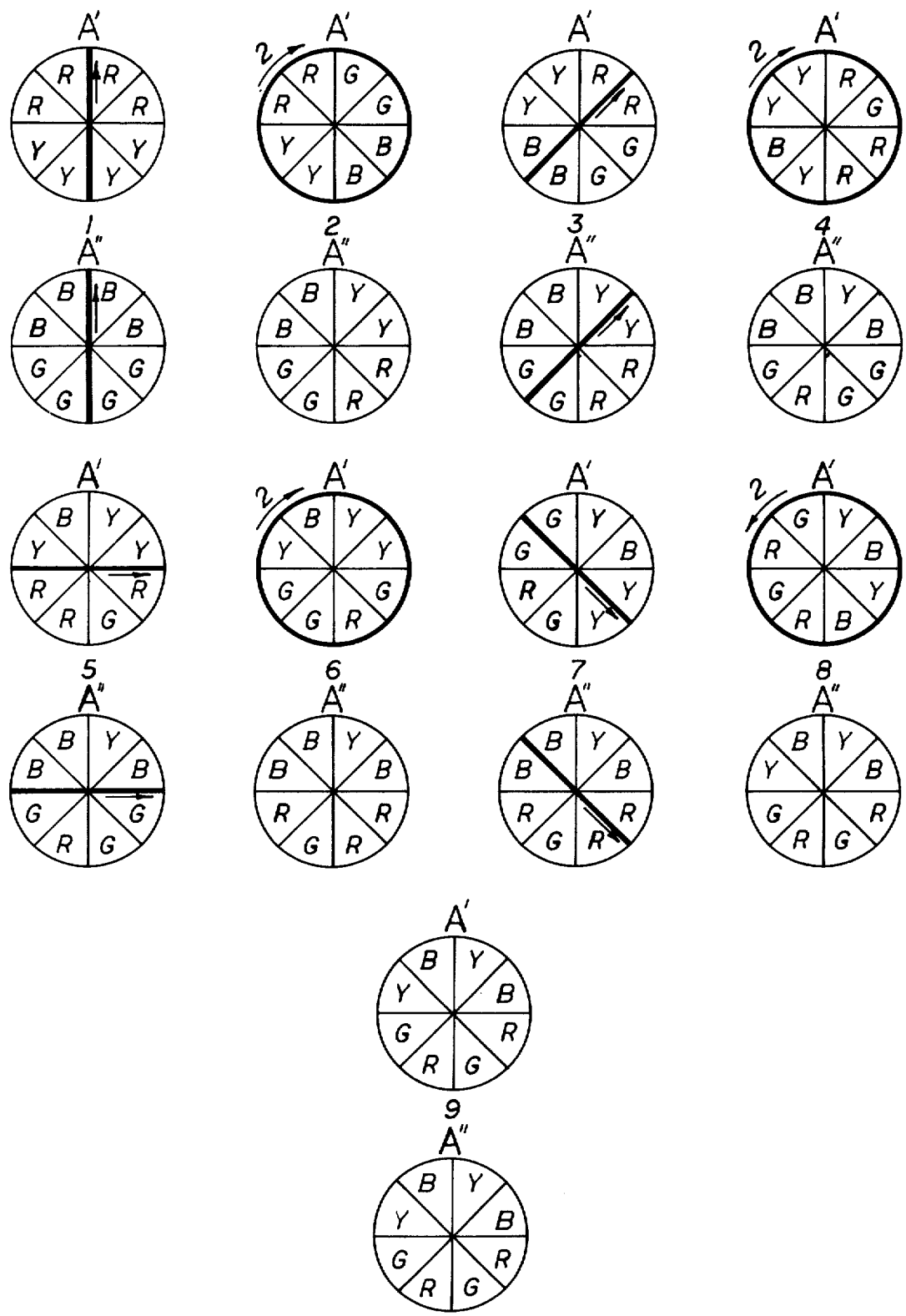
FIG. 23 shows schematically the key of an exercise from FIG. 21.
Figure 24:
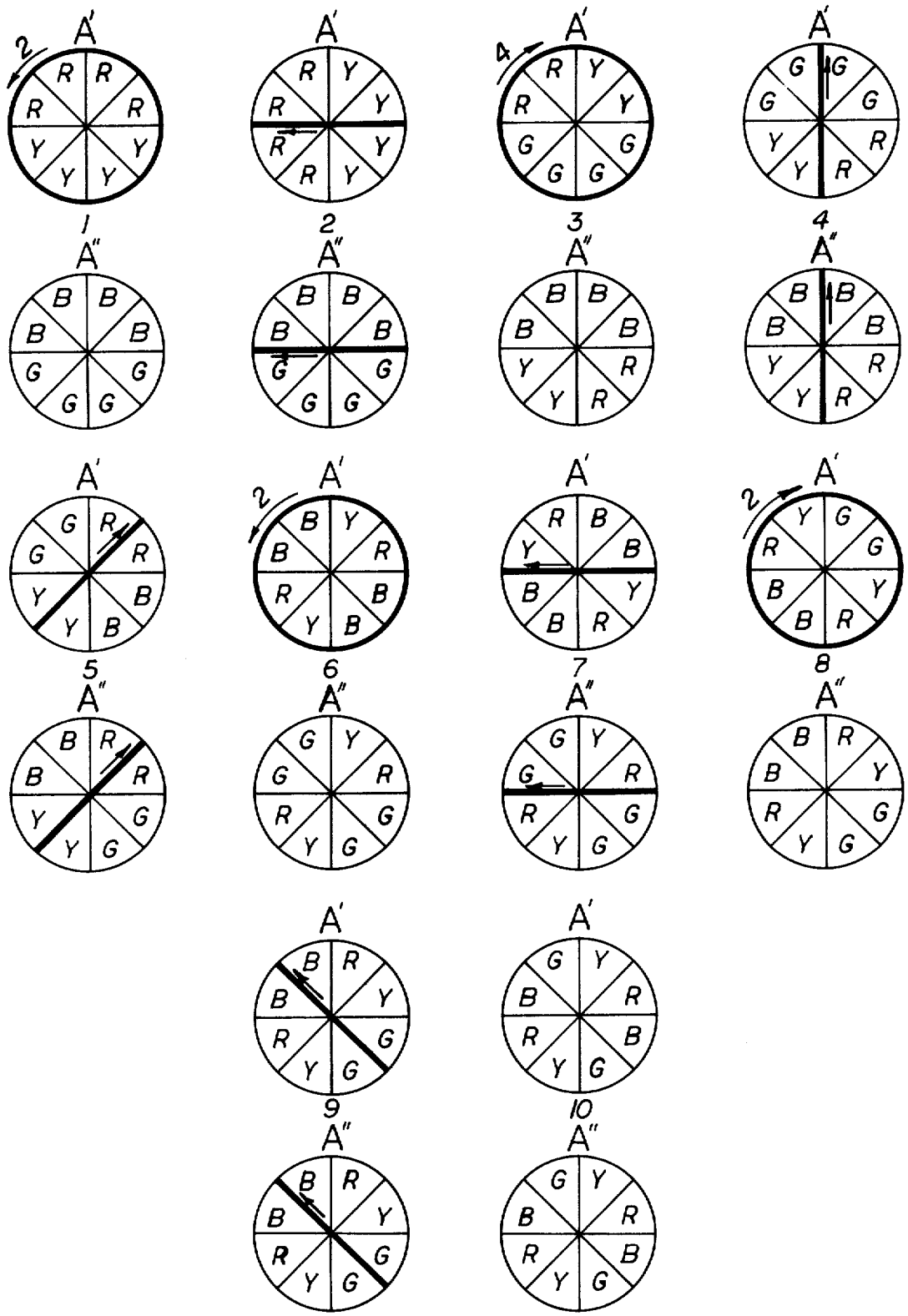
FIG. 24 shows schematically the key of another exercise from FIG. 21.

FIG. 23 shows an exercise for the globe of FIG. 21 and the eight rotations to be made for passing from A'-A" to C'-C". FIG. 24 shows another exercise for the globe of FIG. 21 and the nine rotations to be made for passing from A'-A" to E'-E".

To find the number of all kind of arrangements for different spherical triangles according to their color is necessary to use the theory of permutations. There are two main categories of arrangements, the first is a symmetrical category and the second is at random or nonsymmetrical category. Both categories are important, the first being the category which is to be ordinarily used and the second being the category of great degree of difficulty.

For the globe of FIG. 20 A'-A" if N denotes the number of permutations of 16 things taken 16 at a time with 2 times 8 things alike, then:

$$N = \frac{16P16}{2 \times 8P8} = \frac{16!}{2 \times 8!} = 26 \times 10^7$$

The number of symmetrical arrangements is n 10 and may be more than 10 but close to 10.

If M denotes the number of paths from N nonsymmetrical arrangements to those 10 symmetrical arrangements, then:

$$M = 26 \times 10^7 \times 10 = 26 \times 10^8$$

If m denotes the number of paths from a symmetrical arrangement to another symmetrical arrangement and taking in consideration that for one way there is a forward path and a backward path which are distinguished from one another, then:

$$m = 2 \times 10P2 = 90$$

It is known from exercises of FIGS. 23 and 24 that the number of rotations between two symmetrical positions are eight or nine, and for other paths are less than ten or close to ten.

As a consequence we observe that inside the symmetrical category is easy enough to pass from one to another arrangement and in the meantime we observe that from nonsymmetrical category to an arrangement of symmetrical category is a labyrinth. If turning the hemispheres from one to another symmetrical arrangement we move away from symmetrical category entering in nonsymmetrical category by a great number of rotations which we cannot remember for turning back, we are lost and we can reach the symmetrical category only knowing and using a series of rules for grouping spherical triangles by colors.

These remarks are strengthened by the other globes. As example, for the globe of FIG. 20 B'-B"

$$N = \frac{16P16}{4 \times 4P4} = \frac{16!}{4 \times 4!} = 2 \times 10^{11}$$

$$n = 10$$

$$M = 2 \times 10^{11} \times 10 = 2 \times 10^{12}$$

$$m = 2 \times 10P2 = 90$$

For the globe of FIG. 20 C'-C":

$$N = \frac{24P24}{4 \times 6P6} = \frac{24!}{4 \times 6!} = 2 \times 10^{20}$$

$$n = 10$$

$$M = 2 \times 10^{20} \times 10 = 2 \times 10^{21}$$

$$m = 2 \times 10P2 = 90$$

For the globes covered with world map or colored stories the grade of difficulty is greater because scrambling them we get always in nonsymmetrical category and also because each triangle or quadrelateral has its particular position on the world map or in the colored story. For the globe of FIG. 20 A'-A" covered with world map will be:

$$N = 16P16 = 16! = 2 \times 10^{13}$$

The globes can be made of plastic or metal, or combinations between these materials.

In conclusion the invention herein relates to a great diversity of globes from the simplest to the most complex so to be successfully used by children, teenagers or adults.

Having fully described operative embodiments of this invention and how to be used, I now claim:

1. Apparatus for combining different colors or drawings on a globe made of plastic or metal comprising:

a plurality of first spherical triangles having their sides marked by a plurality of symmetrical meridional lines and by an equatorial line, each said first spherical triangle having a shell bounded by two meridional sides and by an equatorial side, each said meridional side having a first gliding means extending from said equatorial side to a point placed substantially in the vicinity where is room on said shell for four adjacent of said first gliding means, and said equatorial side having a first thickened part;

a plurality of first cylindrical channels for coupling said first spherical triangles between them having the same length as said first gliding means and shaping together with said first gliding means at their end opposite to said equatorial side a truncated cone pointed toward center of said globe, each said first cylindrical channel having two flanges shaping two second gliding means in slidable engagement with said first gliding means, said first gliding means and said second gliding means being hook shaped for preventing the detachment of said first spherical triangles, and said first cylindrical channels having a web which is thin and angled shaping an edge toward inside said globe and being flexible for yielding a variation of distance between said second gliding means;

two poles placed to either point where said first spherical triangles converge between them, each said pole being button shaped and having an inside face and an outside face, said inside face having a semicircular dentation placed concentric with said pole, said outside face having a diametrical rib placed parallel with the diameter of said semicircular dentation, and said outside face having also in center a hole for setting said globe into an earth globe frame; and a rotatable internal framework inside said globe having an axle perpendicularly solid connected to an equatorial disk, said axle having at each end a semicircular spindle matching with said semicircular dentation of said poles and serving for coupling and fixing said poles to said axle by means of a clip, in the vicinity of each end of said axle being perpendicularly placed a partial disk for restraining from rotation half plus 2 of said channels and a first half of said first spherical triangles forming a first hemisphere in comparison with a second half of said first spherical triangles forming a second hemisphere, said partial disk having a periphery shaping a truncated partial cone which matches with said truncated cone, said partial disk having a third gliding means forming a continuity of said second gliding means and for supporting said first gliding means engaged in rotation, said shells being cut toward said poles shaping a hole for allowing the rotation of said first spherical triangles around said spindle, and said equatorial disk having peripherically a spherical section which ensure a correct axial position for said spherical triangles, said spherical section having two circular edges rounded for an easy engagement in meridional rotations of said spherical triangles by means of said first thickened parts, and said spherical section having also on periphery one notch for each said meridional lines for engaging said edges of said cylindrical channels and for ensuring a continuity between said meridional lines at said equatorial line.

2. Apparatus according to claim 1 wherein: said plurality of first spherical triangles are grouped in a plurality of hemispherical couples, said hemispherical couples having their hemispherical components independently rotatable, a first couple being composed of two hemispheres divided between them by said equatorial line and the rest of couples being composed of hemispheres divided between them by said symmetrical meridional lines, said meridional lines being arranged by pairs and said first spherical triangles being multiples of four.

3. Apparatus according to claim 2 wherein: said globe has supplementary: two tropical lines where each said first spherical triangle is cut in two parts forming a second spherical triangle and a first spherical quadrelateral including at each side of said tropical lines a second thickened part, said cylindrical channels cut at said tropical lines, and two tropical disks fixed to said internal framework having two spherical tropical sections including said notchs for each said meridional line.

4. Apparatus according to claim 3 wherein: said second spherical triangles and said first spherical quadrelaterals can be rotated in groups on each pair of said meridional lines, on each said tropical line and on said equatorial line.

5. Apparatus according to claim 3 wherein: said globe is continuous at said equatorial line said first spherical quadrelaterals being coupled in pairs and forming second spherical quadrelaterals which extend between said tropical lines and two adjacent of said meridional lines, and said first thickened parts at said equatorial line and said equatorial disk are not necessary.

6. Apparatus according to claim 5 wherein: said second spherical triangles and said second spherical quadrelaterals can be rotated in groups on each pair of said meridional lines and on each said tropical line.

7. Apparatus according to claim 2 wherein: said plurality of first spherical triangles are grouped in sets of different colors, or are covered with a world map or a colored story.

8. Apparatus according to claim 4 wherein: said second spherical triangles and said first spherical quadrelaterals are grouped in sets of different colors, or are covered with a world map or a colored story.

9. Apparatus according to claim 6 wherein: said second spherical triangles and said second spherical quadrelaterals are grouped in sets of different colors, or are covered with a world map or a colored story.

* * * * *